Patented Dec. 23, 1941

2,266,996

UNITED STATES PATENT OFFICE 2,266,996

HYDROLYSIS OF POLYMERIZED VINYL ESTERS

Norman D. Scott, Sanborn, and John E. Bristol, Niagara Falls, N. Y., assignors to E. I. du Pont de Nemours & Company, Wilmington, Del., a corporation of Delaware No Drawing. Application May 18, 1938, Serial No. 208,636

3 Claims. (Cl. 260—87)

The present invention relates broadly to a method of hydrolyzing polymerized vinyl esters; more specifically, it relates to a method for obtaining partial hydrolysis products of polymerized vinyl esters which contain, in the molecule, residual ester groups in addition to hydoxyl groups.

It has been known for a number of years that polymerized vinyl alcohol could be produced by the saponification or hydrolysis of polymerized vinyl esters. Thus, as described in Hermann and Haehnel United States Patent 1,672,156, a polymerized vinyl ester, such as polyvinyl acetate, is reacted in alcoholic solution with an alkali, such as potassium hydroxide. The products of the reaction are polyvinyl alcohol and an alkaline salt of the acid corresponding to the polyvinyl ester used; i. e., when the initial reactants are polyvinyl acetate and potassium hydroxide, polyvinyl alcohol and potassium acetate are formed. The principal disadvantage of this process lies in the fact that the polyvinyl alcohol is contaminated to a considerable extent with alkaline salts which as a general rule can not be removed by ordinary washing methods. Accordingly, in order to obtain a pure product it is necessary to resort to rather cumbersome purification methods such as dissolving and reprecipitating the polyvinyl alcohol or subjecting it to dialysis. The use of such purification methods of course adds considerably to the cost of producing the product.

More recently, Hermann, Haehnel and Berg, United States Patent 2,109,883, have found that polyvinyl alcohol could be obtained by the catalytic hydrolysis of polymerized vinyl esters. According to this method a solution of the polymerized vinyl ester is reacted with an alcohol in the presence of a small amount of an alkali or an acid as a hydrolysis catalyst. Starting, for example, with polymerized vinyl acetate and methanol, the products of the reaction are polyvinyl alcohol and methyl acetate. The amount of catalyst employed is so small that no significant contamination of the product occurs and it is thus possible to obtain directly polyvinyl alcohol of a high degree of purity without further purification.

The foregoing method is in most respects very satisfactory and has been extensively employed in the manufacture of polyvinyl alcohol. For many purposes, however, polyvinyl alcohols which contain residual ester groups have certain advantages over completely hydrolyzed polyvinyl alcohol. For example, the water-soluble partial esters of polyvinyl alcohol are, in general, considerably more effective as emulsifying and dispersing agents than are the corresponding completely hydrolyzed products. Obviously, it is possible to produce such partially hydrolyzed products according to the methods of the above mentioned Hermann et al. patents by interrupting the hydrolysis reaction before it has reached completion. In actual practice, however, a number of difficulties are encountered in the manufacture of partially hydrolyzed products by these methods. Perhaps the most important of these difficulties is the fact that the partially hydrolyzed products are formed as colloidal gelatinous masses which are extremely difficult to filter or otherwise to separate from the reaction mixture. In addition, it has been found difficult to control the course of the reaction precisely enough to obtain products of any predetermined degree of hydrolysis. Even though the proportions of the reactants and the conditions of the reaction be maintained as closely identical as possible in successive runs, the products obtained will show substantial differences in their degree of hydrolysis. Moreover, the products of even the same batch may not be uniform throughout, i. e., certain portions of the batch will be more completely hydrolyzed than other portions.

It is an object of the present invention to provide an improved method for hydrolyzing polymerized vinyl esters. A further object is to provide a method of preparing partial esters of polyvinyl alcohol wherein the product is obtained in a form which is readily filterable from the reaction medium. A further object is to provide a method of preparing partial esters of polyvinyl alcohol which are hydrolyzed to a uniform and predetermined extent. Other objects and advantages of the invention will be evident from the ensuing description thereof.

The foregoing objects are accomplished in accordance with the present invention by reacting polymerized vinyl esters with hydrolytic alcohols in the presence of a solvent comprising the ester of the hydrolytic alcohol used with the acid residue of the polymerized vinyl ester used. Thus, for example, when hydrolyzing polyvinyl acetate with methanol, the reaction is carried out in the presence of methyl acetate as a solvent. Similarly, if polymerized vinyl propionate is to be hydrolyzed with ethyl alcohol, ethyl propionate is used as the solvent.

The extent of hydrolysis of the reaction product depends upon the temperature of the reaction, its duration, the kind and amount of hydrolysis catalyst used, and the relative concentrations of hydrolytic alcohol and ester solvent in the reaction medium. We have found, however, that when the solvent ester is present in the initial reaction medium, the effect of the other variables such as time, temperature and catalyst concentration, is much less than when the ester solvent is not present. Preferably, we regulate the course of the reaction by establishing a uniform standard of temperature and catalyst concentration and vary the degree of hydrolysis by regulating the relative proportions of hydrolytic alcohol and ester solvent. These proportions may vary through wide limits, depending upon the degree of polymerization of the polyvinyl ester, and the degree of hydrolysis which is desired in the reaction product. In general, we prefer to utilize reaction media wherein the initial ratio of ester to hydrolytic alcohol is from about 0.3:1 to about 6:1 parts by weight.

The hydrolysis reaction takes place readily at relatively low temperatures. It is, in fact, generally preferable to maintain the temperature of the reaction mixture at room temperature or somewhat lower, e. g. from about 15 to 25° C. This is not, however, a limiting temperature range since the reaction may be carried out at any temperature from about 0° C. up to the boiling point of the hydrolytic alcohol used.

The hydrolysis reaction is promoted by the action of alkaline catalysts such as sodium or potassium hydroxides, alkali metal alcoholates, ammonia, amines, and other organic bases; or by acid catalysts such as dilute sulfuric or hydrochloric acids, or organic acids, particularly sulfonic acids. In general, the alkaline catalysts are to be preferred over the acid catalysts.

As the hydrolytic alcohol, practically any alcohol which is liquid under the conditions of the reaction may be used. For most purposes methanol is the preferred hydrolytic alcohol due to the fact that it forms esters very readily and the comparatively low boiling points of the methyl esters render them more easily separable from the reaction mixture and the higher esters. However, under some conditions, and depending upon the commercial demand for various esters, it may be advantageous to use other alcohols, such as ethyl alcohol, propyl alcohol, butyl alcohol, glycols, etc.

Water exerts an inhibiting effect upon the hydrolysis reaction; hence, although relatively small amounts of water may be tolerated, it is preferred that the hydrolytic alcohols as well as the other reactants be as nearly anhydrous as is feasible. The term "anhydrous", as used herein and in the appended claims, is not intended to exclude the presence of such relatively small amounts of water as may be present in commercial grades of the reagents employed or such as may be introduced therein by carrying out the reaction under ordinary atmospheric conditions.

In order to regulate the time of the reaction precisely the course of the hydrolysis may be interrupted at the desired stage of conversion by neutralizing the catalyst or by the addition of water to the reaction medium. Thus, when an alkaline catalyst is used for the hydrolysis of polyvinyl acetate, acetic acid, in an amount equivalent to that of the alkali present, may be added to stop the reaction when the desired degree of conversion has been attained.

Due to the number of variables involved it is not possible to lay down definite rules for the production of products of all predetermined degrees of hydrolysis. However, the following specific examples are illustrative of the results obtained according to the method of the invention and may serve as a guide for the production of polymers of varying degrees of hydrolysis.

Example I

In an enamel-lined vessel equipped with an anchor type agitator, 600 grams of highly polymerized polyvinyl acetate was dissolved in 470 grams of methanol and 1830 grams of methyl acetate. After cooling the solution to a temperature of 20° C., a solution of 18 grams of sodium hydroxide in 200 grams of methanol was added. The resultant solution was agitated for a period of 3 hours and 45 minutes, whereupon the hydrolysis product was precipitated in the form of white shreds, which were easily separated from the liquid by filtration. After drying, a uniform, white, water-soluble product was obtained which had a saponification number of 58, corresponding to approximately 95% hydrolysis of the vinyl acetate.

Example II

In the same equipment as described in Example I, 300 grams of highly polymerized polyvinyl acetate was dissolved in a mixture of 900 parts of methanol and 1800 parts of methyl acetate. The solution was cooled to 20° C. and 3 grams of sodium hydroxide dissolved in 100 cc. of methanol was added. The solution was agitated for a period of 2½ hours and then the excess caustic was neutralized with acetic acid. After another half hour of agitation the product was filtered off and dried. It had a saponification number of 284, corresponding to 72% hydrolysis, and was soluble in water.

Example III

A solution of 300 grams of highly polymerized polyvinyl acetate in 900 grams of methyl acetate and 1800 grams of methanol was treated exactly as described in Example II above. The product obtained had a saponification number of 234, corresponding to about 78% hydrolysis.

Example IV

To a solution of 100 grams of a low polymer of polyvinyl acetate in 400 grams of methyl acetate was added 4.7 grams of sodium hydroxide dissolved in 74.4 grams of methanol. The mixture was agitated as described in the previous examples for a period of six hours. The product was readily filtered from the reaction medium and, after drying, had a saponification number of 95, corresponding to 92% hydrolysis.

The foregoing examples describe the hydrolysis of polyvinyl acetate. However, other polymerized vinyl esters such as the formate, propionate, butyrate, benzoate, lactate, pyruvate, chloracetate, amino acetate, etc., may be similarly hydrolyzed by analogous procedures.

By the process of the present invention it is possible to obtain in a simple and efficacious manner partial esters of polyvinyl alcohol of any desired degree of hydrolysis. The product is obtained in a form which is readily separable from the reaction medium by filtration, whereas, in the absence of the solvent esters utilized in our process, the partially hydrolyzed products precipitate in a colloidal gelatinous form and are thus practically impossible to separate from the mother liquor by filtration. The products of each batch are uniform throughout, and products of a predetermined degree of hydrolysis may be obtained consistently and reproducibly. Due to the fact that the ester used as the solvent is the same ester as is formed by the hydrolysis reaction, the recovery of solvents is facilitated, since the sole components of the mother liquor (aside from the catalyst) are the ester and excess hydrolytic alcohol.

While the process of the invention is of particular value in the manufacture of partial esters of polyvinyl alcohol, it may also be used to advantage in preparing completely hydrolyzed polyvinyl alcohol.

It is to be understood that the invention is not restricted to the specific embodiments thereof described hereinabove but embraces all such variations, modifications and equivalents as fall within the scope of the appended claims.

We claim:

1. The method of partially hydrolyzing a polymerized vinyl ester which comprises reacting the same with a hydrolytic alcohol in an anhydrous reaction medium containing an alkaline hydrolysis catalyst and a solvent ester which is the ester of said hydrolytic alcohol with the acid residue of said polymerized vinyl ester, the ratio of solvent ester to hydrolytic alcohol in the initial reaction mixture being from about 0.3:1 to about 6:1 parts by weight, and separating the partially hydrolyzed product from the reaction medium before the hydrolysis reaction has gone to completion.

2. The method of partially hydrolyzing polymerized vinyl acetate which comprises reacting the same with a hydrolytic alcohol in an anhydrous reaction medium containing an alkaline hydrolysis catalyst and a solvent ester which is the acetate of said hydrolytic alcohol, the ratio of solvent ester to hydrolytic alcohol in the initial reaction mixture being from about 0.3:1 to about 6:1 parts by weight, and separating the partially hydrolyzed product from the reaction medium before the hydrolysis reaction has gone to completion.

3. The method of partially hydrolyzing polymerized vinyl acetate which comprises reacting the same with methanol in an anhydrous reaction medium containing an alkaline hydrolysis catalyst and methyl acetate, the ratio of methyl acetate to methanol in the initial reaction mixture being from about 0.3:1 to about 6:1 parts by weight, and separating the partially hydrolyzed product from the reaction medium before the hydrolysis reaction has gone to completion.

NORMAN D. SCOTT.
JOHN E. BRISTOL.